United States Patent [19]

Pettus et al.

[11] Patent Number: 4,693,497
[45] Date of Patent: Sep. 15, 1987

[54] COLLET CONNECTOR

[75] Inventors: Ronald G. Pettus, Houston; Thomas R. Schmitz, Katy, both of Tex.

[73] Assignee: Cameron Iron Works, Inc., Houston, Tex.

[21] Appl. No.: 876,086

[22] Filed: Jun. 19, 1986

[51] Int. Cl.[4] ............................................. F16L 25/00
[52] U.S. Cl. ........................................ 285/12; 285/24; 285/315; 285/320; 285/334.2; 285/920
[58] Field of Search .................... 285/315, 320, 16, 24, 285/34, 334.2, 35, 326, 920, 12

[56] References Cited

U.S. PATENT DOCUMENTS

| | | | |
|---|---|---|---|
| 959,258 | 5/1910 | Purves | 285/34 |
| 3,096,999 | 7/1963 | Ahlstone et al. | |
| 3,321,217 | 5/1967 | Ahlstone | |
| 3,353,595 | 11/1967 | Nelson et al. | |
| 4,335,904 | 6/1982 | Saliger et al. | 285/920 |
| 4,337,971 | 7/1982 | Kendrick | 285/315 |
| 4,433,854 | 2/1984 | Driver et al. | 285/315 X |
| 4,516,795 | 5/1985 | Baugh | 285/315 |
| 4,526,406 | 7/1985 | Nelson | 285/315 X |

Primary Examiner—Dave W. Arola
Attorney, Agent, or Firm—Vinson & Elkins

[57] ABSTRACT

The improved remotely actuated collet connector of the present invention is suitable for joining tubular members with similar or different end preparations or profiles and includes a housing to support the connector from a first tubular member, a plurality of collet fingers or segments mounted within the housing and around the exterior of the first tubular member, an actuator ring surrounding the fingers to move the fingers to release or latch position, pressure responsive means for moving the actuator ring, each of the collet fingers having a first engaging surface and an adapter secured to the finger and having a second engaging surface, said first engaging surfaces mating with the end profile of the first tubular member and said second engaging surfaces of said adapters mating with the end profile of the second tubular member so that when the collet fingers are moved to latch position they secure the first and second tubular members together. A seal ring having a configuration to mate with the internal end sealing surface of the first and second tubular members is positioned to seal between the end sealing surfaces of the members when they are secured together.

8 Claims, 4 Drawing Figures

COLLET CONNECTOR

BACKGROUND

Collet connectors are commonly used to provide a remotely actuated connection between tubular members such as pipelines or other tubular members. In the oil and gas industry it has been common practice for each manufacturer to have its own design for connections between components and with collet connectors the ends of the tubular members have a different configuration.

The U.S. Pat. No. 3,096,999 to A. G. Ahlstone et al dated July 9, 1963 illustrates one form of collect connector which has been used in the past having tapering shoulders on short hub type flanges which are engaged by latching fingers to maintain the tubular members connected. The latching fingers are moved by a ring which cams them into latching position and such ring is moved by a suitable actuator. The tubular members are sealed with respect to one another by an annular seal ring made of a resilient material.

Another example of a similar joint used in underwater well completions is shown in U.S. Pat. No. 3,353,595 to B. H. Nelson et al, dated Nov. 21, 1967. This structure is quite similar to the Ahlstone et al structure except that the sealing between the two members is accomplished by a tapered metal seal ring positioned between the two members in engagement with tapered surfaces machined in the inner surfaces of the members at their connecting ends.

The A. G. Ahlstone Pat. No. 3,321,217 dated May 23, 1967 discloses another type of joint construction which is controlled by remote actuation to move latching segments into multiple grooves in the exterior of one member and the segments are secured to the other tubular member.

Difficulty is encountered in making a remote connection between tubular members which are prepared for separate types of latching members or end preparations.

SUMMARY

The present invention relates to an improved remotely actuated connector which is suitable for connecting between similar or different types of end preparations on the tubular members being connected. The improved connector is a collet connector having collet fingers actuated by a ring which is moved by an actuator. The collet fingers include adapters which are readily secured to the fingers and which can convert the ends of the collet fingers to engage more than one type of end preparation.

An object of the present invention is to provide an improved type of collet connector which may be used with more than one type of end preparation on the tubular members to be connected.

A further object is to provide an improved type of collet connector which may remotely connect tubular members with different end preparations and which accommodates different configuarations of sealing surfaces.

BRIEF DESCRIPTION OF THE DRAWINGS

These and other objects and advantages are hereinafter set forth and explained with reference to the drawings wherein.

DESCRIPTION OF THE PREFERRED EMBODIMENTS

Figures 1A, 1B:
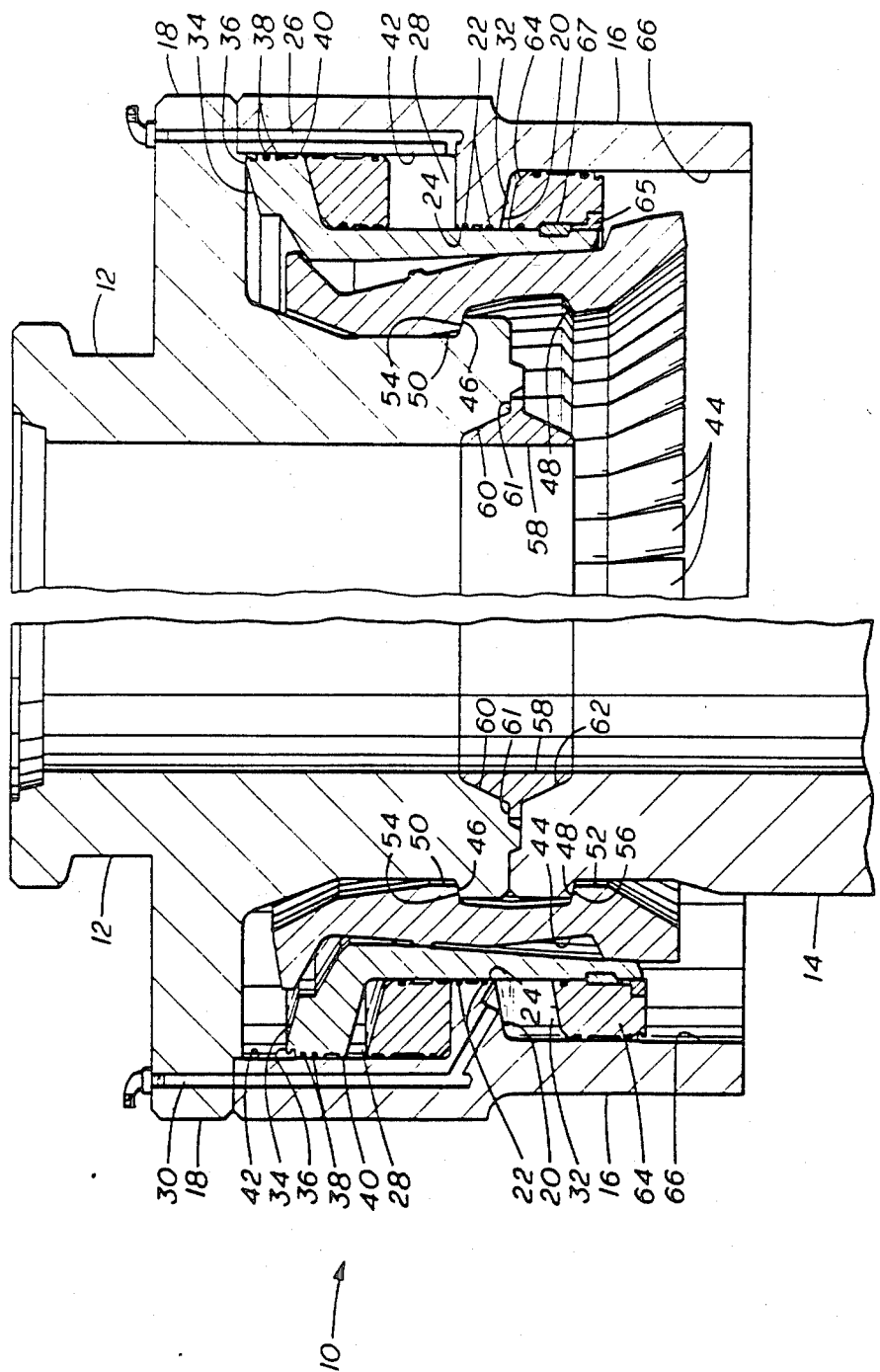
FIG. 1 is a sectional view of a connector of the prior art with FIG. 1A illustrating the connection being made between tubular members having end preparations which are similar and FIG. 1B illustrating the connection in its unlatched position with the second tubular member removed.

Remotely actuated collet connector 10 of the prior art is shown in FIG. 1 with FIG. 1A illustrating the connector 10 in its locking position joining first tubular member 12 to second tubular member 14 and with FIG. 1B illustrating connector 10 mounted on first tubular member 12 but with second tubular member 14 removed.

Connector includes housing 16 secured to flange 18 of first tubular member 12 and extending axially in surrounding relationship over the position into which second tubular member 14 is positioned for the connection. Upper and lower annular operating cylinders 28 and 32 are bounded by annular lip 20 of housing 16 which extends inwardly from housing 16 and includes seals 22, such as O rings, positioned in grooves on the inner surface 24 of lip 20. Passage 26 extends through flange 18 and through housing 16 and opens into upper cylinder 28 above lip 20. Passage 30 extends through flange 18 and through housing 16 and opens into lower cylinder 32 on the opposite side of lip 20 from cylinder 28.

Actuator ring 34 is positioned within housing 16 and includes flange 36 extending outwardly with seals 38 in its outer surface 40 to seal against the upper inner surface 42 of housing 16.

Latching fingers or segments 44 are positioned within actuator ring 34 and are closely spaced together as best seen in FIG. 1B. Latching fingers 44 include shoulders 46 and 48 on projections 50 and 52 and are adapted to engage and secure tapered shoulders 54 and 56 on first and second tubular members 12 and 14. Shoulders 54 and 56 are similar end preparations for which the collet connections of the prior art were adapted to connect.

Metal seal ring 58 is positioned between the inner ends of first and second tubular members 12 and 14 and seals against the inner tapered surfaces 60 and 62 of members 12 and 14, respectively. Seal ring 58 includes outer diameter enlargement 61 which is used to secure seal ring 58 to first tubular member 12 by suitable means such as bolting (not shown).

Cylinder head ring 64 is secured to the exterior surface of actuator ring 34 at its lower outer end; is suitably attached thereto by retainer 65 and split ring 67; and is sealed to the lower interior surface 66 of housing 16 and to actuator ring 34 as shown. Retainer ring 65 is secured by bolting (not shown) to cylinder head ring 64.

In FIG. 1A the two tubular members 12 and 14 are connected to one another in sealed locking engagement by the actuation of ring 34 in the downward direction to move fingers 44 into tight clamping engagement with shoulders 54 and 56 and to sealingly engage metal seal ring 58 between surfaces 60 and 62 of members 12 and 14.

Figure 2:
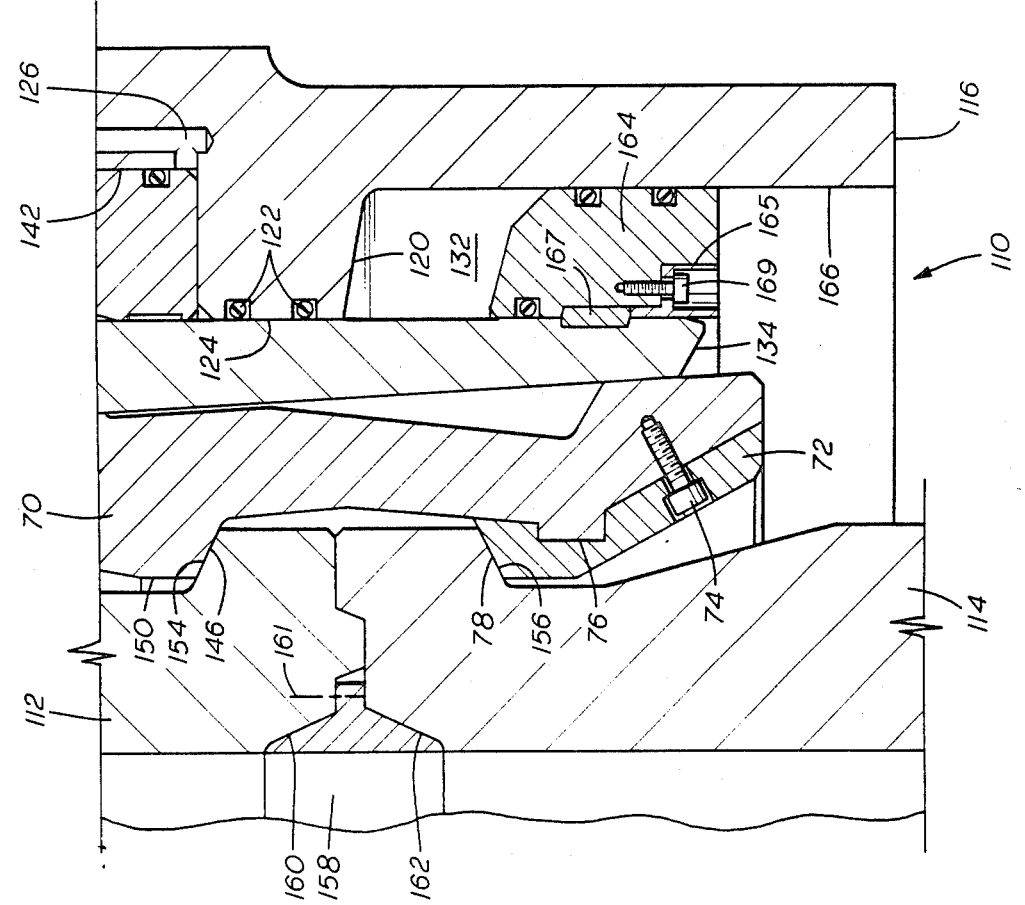
FIG. 2 is a detail sectional view of the engaging portions of the improved connector of the present invention providing connection between two tubular members having similar end preparation.

Improved collet connector 110 is illustrated in one of its forms in FIG. 2. Connector 110 is similar to connector 10 and similar components are given the same number with the prefix 1, e.g., first tubular member 112.

Connector 110 includes housing 116 secured to flange (not shown) of first tubular member 112 and extending axially in surrounding relationship over the position into which second tubular member 114 is positiond for the connection. Upper and lower annular operating cylinders 128 and 132 are bounded by annular lip 120 of housing 116 which extends inwardly from housing 116 and includes seals 122, such as O rings, positioned in grooves on the inner surface 124 of lip 120. Passage 126 extends through the flange (not shown) on member 112 and through housing 116 and opens into upper cylinder 128 above lip 120. Another passage (not shown) extends through the flange on member 112 and through housing 116 and opens into lower cylinder 132 on the opposite side of lip 120 from cylinder 128.

Actuator ring 134 is positioned within housing 116 and includes a flange (not shown) extending outwardly and sealing against the inner surface 142 of housing 116.

Latching fingers 70 each include adapters 72 which are secured to the inner surface of fingers 70. Cap screws 74 and projections 76 are utilized to secure adapters 72 to fingers 70. Latching fingers 70 include shoulder 146 on projection 150 which engages tapered should 154 on first tubular member 112 and shoulder 78 on adapter 72 which engages tapered shoulder 156 on second tubular member 114.

Metal seal ring 158 is positioned between the inner ends of first and second tubular members 112 and 114 and seals against the inner tapered surfaces 160 and 162 of members 112 and 114, respectively. Seal ring 158 includes outer diameter enlargement 161 which is used to secure seal ring 158 to first tubular means 112 by suitable means such as bolting (not shown).

Cylinder head ring 164 is secured to the exterior surface of actuator ring 134 at its lower outer end and is suitably attached thereto by retainer 165 and split ring 167 and is sealed to the lower interior surface 166 of housing 116 and to actuator ring 134 as shown. Retainer 165 is secured to cylinder head ring 164 by bolts 169.

Figure 3:
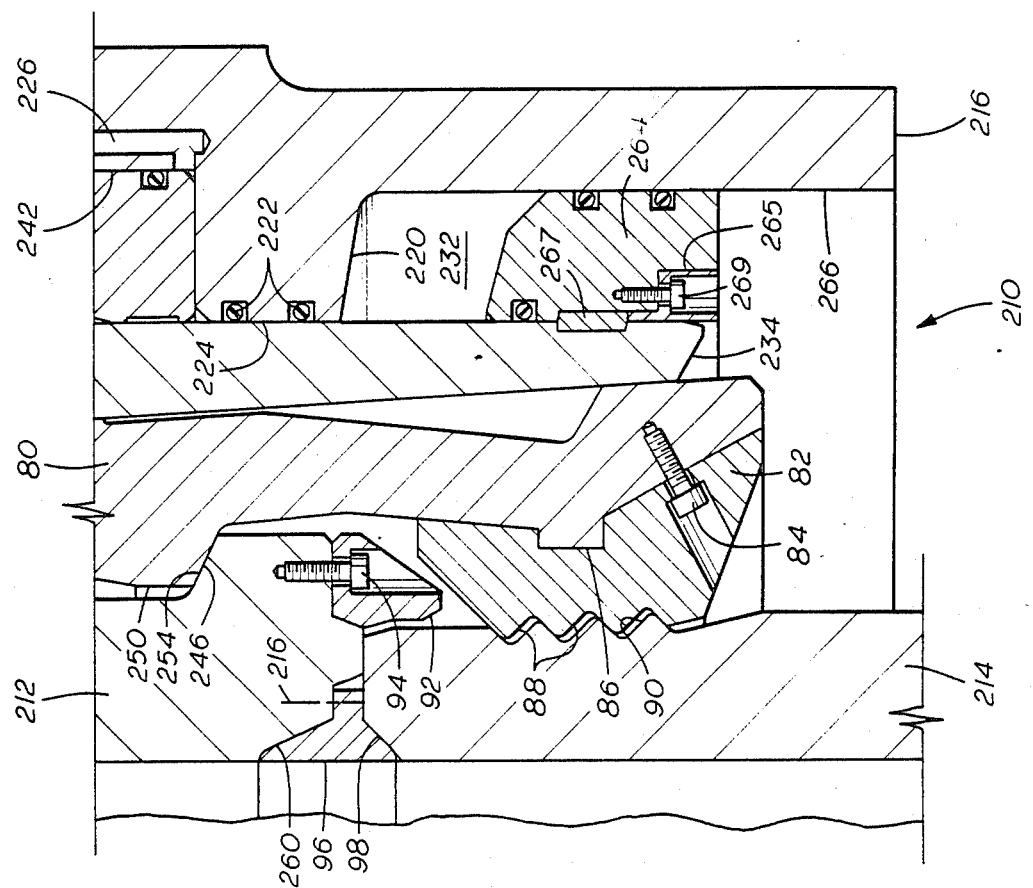
FIG. 3 is another similar detailed sectional view of the improved connection of the present invention providing connection between two tubular members having dissimilar end preparations.

Improved collet connector 210 is illustrated in one of its forms in FIG. 3. Connector 210 is similar to connector 10 and similar components are given the same number with the prefix 2, e.g., the first tubular member 212.

Connector 210 includes housing 216 secured to flange (not shown) of first tubular member 212 and extending axially in surrounding relationship over the position into which second tubular member 214 is positioned for the connection. Upper and lower annular operating cylinders 228 and 232 are bounded by annular lip 220 of housing 216 which extends inwardly from housing 216 and includes seals 222, such as O rings, positioned in grooves on the inner surface 224 of lip 220. Passage 226 extends through the flange (not shown) on member 212 and through housing 216 and opens into upper cylinder 228 above lip 220. Another passage (not shown) extends through the flange on member 212 and through housing 216 and opens into lower cylinder 232 on the opposite side of lip 220 from cylinder 228.

Actuator ring 234 is positioned within housing 216 and includes a flange (not shown) extending outwardly and sealing against the inner surface 242 of housing 216.

Latching fingers 80 each include adapters 82 which are secured to the inner surface of fingers 80. Cap screws 84 and projections 86 are utilized to secure adapters 82 to fingers 80. Latching fingers 80 include shoulder 246 on projection 250 which engages tapered shoulder 254 on first tubular member 212 and projections 88 on adapter 82 which engage within grooves 90 on the exterior of second tubular member 214. Additionally alignment ring 92 is secured to the lower end of first tubular member 212 by cap screws 94 to assist in guiding tubular member 212 and latching fingers 80 onto tubular member 214.

Metal seal ring 258 is positioned between the inner ends of first and second tubular members 212 and 214 and seals against the inner tapered surfaces 260 and 98 of members 212 and 214, respectively. Seal ring 258 includes outer diameter enlargement 261 which is used to secure seal ring 258 to first tubular member 212 by suitable means such as bolting (not shown).

Cylinder head ring 264 is secured to the exterior surface of actuator ring 234 at its lower outer end and is suitably attached thereto by retainer 265 and split ring 267 and is sealed to the lower interior surface 266 of housing 216 and to actuator ring 234 as shown. Retainer 265 is secured to cylinder head ring 264 by bolts 269.

In all forms of the invention, the delivery of fluid under pressure through passage 26 to chamber 28 causes actuator ring 34 to move upwardly toward flange 18; and through passage 30 to chamber 32 causes actuator ring 34 to move downwardly away from flange 18. These movements of actuator ring 34 in engagement with the exterior cam surfaces of the latching fingers cause the releasing and locking, respectively, by the movement of the latching fingers in their engagement of the end configurations of first and second tubular members.

What is claimed is:
1. A remotely actuated connector for connecting a first and second tubular member together comprising
   a plurality of latching fingers,
   an actuator ring surrounding said fingers,
   pressure responsive means for moving said actuator ring,
   means for selectively delivering fluid pressure to opposite sides of said pressure responsive means to move said actuating ring,
   each of said latching fingers having an engaging projection at one end and a locating means at the other end with both of said projecting facing inwardly and means for securing an adapter to said other end, and
   a plurality of adapters,
   one of said adapters being connected to said other end of each one of said latching fingers on said projection and secured thereto by said securing means,
   said adapters each providing at least one of a first projection and a second replaceable projection on said inner ends of said latching fingers which engage and secure the end profiles of adjacent tubular members together.

2. A connector according to claim 1 wherein said pressure responsive means includes
   a flange on said actuator ring, and
   said fluid delivering means delivers fluid pressure to opposite sides of said flange to move said actuator ring.

3. A connector according to claim 1 wherein
   said first projection includes a flange engaging surface, and
   said second replaceable projection includes a flange engaging surface.

4. A connector according to claim 1 wherein
said first projection includes a flange engaging surface, and
said second replaceable projection includes surfaces for engaging with grooves in the exterior end profile of said second tubular member.

5. A connector according to claim 4 including
a guide ring secured to the lower end of said first tubular member to assist in guiding said first tubular member and said latching fingers onto said second tubular member.

6. A collet connector for connecting a first tubular member having an exterior end profile and an interior end sealing surface to a second tubular member having an exterior end profile and an interior end sealing surface comprising
a housing supported from said first tubular member,
a plurality of collet segments positioned around the exterior of said first tubular member and having a portion extending beyond the end of said first tubular member,
said segments having an inner profile for engaging the exterior end profile of said first tubular member and an exterior cam surface,
a cam ring surrounding said collet segments and engaging the exterior cam surfaces of said segments,
a plurality of profile engaging adapters,
adapter locating means on the inner surface of said segments extending beyond said first tubular member,
means for securing one of said adapters to the inner surface of said segments extending beyond said first tubular member with said adapted being in engagment with said locating means so that the adapter is in the desired position,
said adapters each having an inner profile for engaging the exterior end profile of said second tubular member,
a seal ring positioned to engage the interior sealing surfaces of said first and second tubular members, and
means for moving said cam ring to move the segments so that the segments and adapters engage said exterior end profiles of said first and second tubular members to connect and seal said tubular members together.

7. A collet connector for joining a first and a second tubular member with similar or different end preparations or profiles comprising
a housing supported from the first tubular member,
a plurality of collet fingers mounted within the housing and around the exterior of said first tubular member,
an actuator ring surrounding the collet fingers to move the fingers between release or latch position,
pressure responsive means for moving the actuator ring,
each of collet fingers having a first engaging surface,
a plurality of adapters each having a second engaging surface,
means for releasably securing said adapters to the ends of said fingers opposite said first engaging surface,
said first engaging surface of said fingers mating with the end profile of the first tubular member and said second engaging surface of said adapters mating with the end profile of the second tubular member so that when the collet fingers are moved to latch position their secure the first and second tubular members together.

8. A collet connector according to claim 7 including
a seal ring having a configuration to mate with the internal end sealing surface of first and second tubular members and positioned therein to seal the members when they are secured together.

* * * * *